United States Patent [19]
Oda et al.

[11] 4,123,085
[45] Oct. 31, 1978

[54] SAFETY PANELLING ARRANGEMENT WITH A DEFORMABLE STRUCTURE

[75] Inventors: Takaaki Oda, Musashi-Murayama; Chiyokatsu Yokokura, Kunitachi, both of Japan

[73] Assignee: Nissan Motor Company, Limited, Japan

[21] Appl. No.: 763,334

[22] Filed: Jan. 28, 1977

[30] Foreign Application Priority Data

Jan. 31, 1976 [JP] Japan .............................. 51/10542[U]

[51] Int. Cl.² .............................................. B60R 21/08
[52] U.S. Cl. ........................................ 280/752; 180/90
[58] Field of Search .................. 280/751, 752; 180/90; 296/70; 293/98

[56] References Cited

U.S. PATENT DOCUMENTS

| 3,506,295 | 4/1970 | Yancy | 293/98 |
| 3,774,713 | 11/1973 | Stegmaier | 180/90 |
| 3,924,707 | 12/1975 | Renner et al. | 280/752 |
| 3,930,665 | 1/1976 | Ikawa | 280/752 |

FOREIGN PATENT DOCUMENTS

| 2,259,906 | 6/1974 | Fed. Rep. of Germany | 280/752 |
| 2,312,202 | 9/1974 | Fed. Rep. of Germany | 280/752 |
| 2,149,827 | 3/1973 | France | 280/752 |

*Primary Examiner*—Joseph F. Peters, Jr.
*Assistant Examiner*—Norman L. Stack, Jr.

[57] ABSTRACT

A support member is set in a panelling arrangement of a vehicle in a manner that the longitudinal axis thereof is inclined with respect to that of the vehicle. Thus, the panelling arrangement with the support member can be sufficiently deformed upon impact in case of collision to contribute substantially to the safety of the front seat passenger.

13 Claims, 15 Drawing Figures

FIG. 6
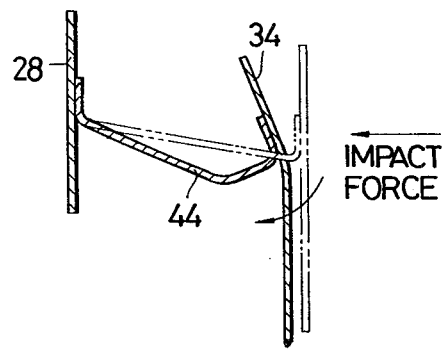
FIG. 7
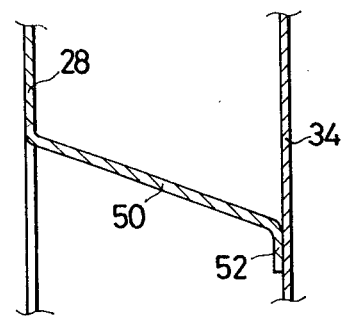
FIG. 8
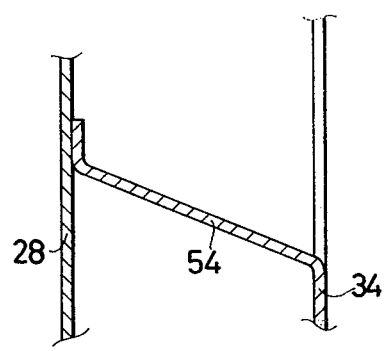
FIG. 10(A)
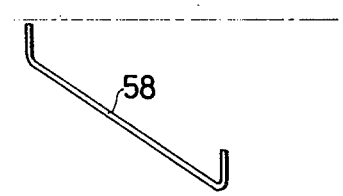
FIG. 10(B)
FIG. 9
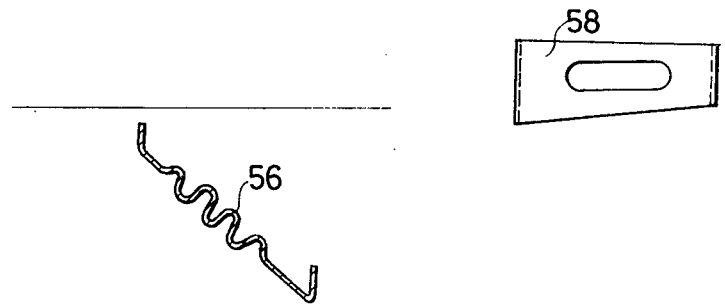

SAFETY PANELLING ARRANGEMENT WITH A DEFORMABLE STRUCTURE

The present invention relates in general to a safety panelling arrangement at the dashboard of a motor vehicle, and more particularly to a safety panelling arrangement which can protect a front seat passenger of the motor vehicle from being injured by striking his head against the arrangement in case of vehicle collision.

It is well known that the so-called "secondary collision", that is the collision between the front seat passenger and his enviromental surroundings, is a greater source of bodily injury than the so-called "primary collision" of the motor vehicle with some impedance. A common injury causing impact during this secondary collision is between the head of the passenger and the panelling arrangement that extends across the front of the passenger compartment of the vehicle. In order to lessen the force of the impact between the passenger's head and the panelling arrangement, modernized panelling arrangements are covered with an energy absorbing padding. However, such padding is limited in the amount of energy that it can absorb.

In view of the above, some established standards such as FMVSS (Federal Motor Vehicle Safety Standard) have recommended that the force of impact with the panelling arrangement should not exceed 80 times the force of gravity (G's) during more than 3 milliseconds measured for a 16 pound (= 7.26 Kg) ball with a diameter of 6.5 inches (= 16.5 cm) and swinging through an arc at a velocity of 15 miles per hour (= 24 Km/h).

Thus, it is an object of the present invention to provide a safety panelling arrangement for a motor vehicle which contributes substantially to the safety of the front seat passenger in case of collision.

It is another object of the present invention to provide an improved panelling arrangement which is constructed to satisfy the established standards mentioned above.

It is still another object of the present invention to provide an improved safety panelling arrangement which is constructed from a material of sufficient strength to perform the requisite structural supporting function while being capable of sufficient deformation upon impact to effectively absorb the impact force of the front seat passenger.

It is a further object of the present invention to provide a safety panelling arrangement which can be readily made by only slightly modifying the conventional panelling arrangement.

Other objects and advantages of the present invention will become apparent from the following description when taken in conjunction with the accompanied drawings, in which:

FIG. 6 is an illustration showing a condition wherein the support member of FIG. 5 is deformed;

FIGS. 7 to 11 show several examples of the support member which are employable in the safety panelling arrangement according to the present invention;

Prior to explanation of the construction of the safety panelling arrangement of the subject invention, a description of a conventional safety panelling arrangement will be given with the aid of FIGS. 1 to 3 in order to clarify the inventive steps of the present invention.

Figure 1:
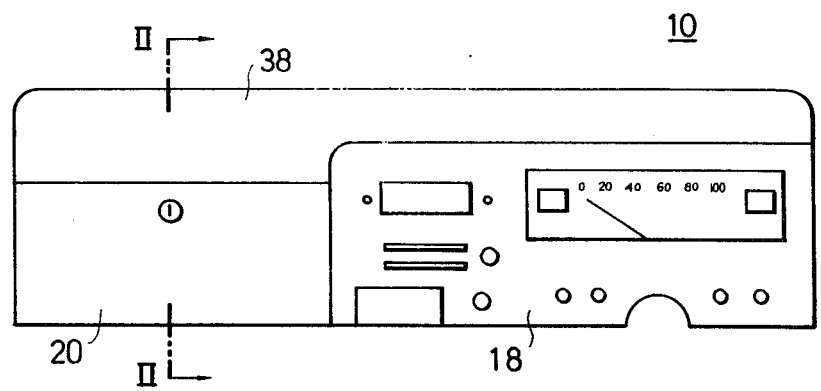
FIG. 1 is a front view of a conventional panelling arrangement facing the passenger compartment of the vehicle.
Figure 2:
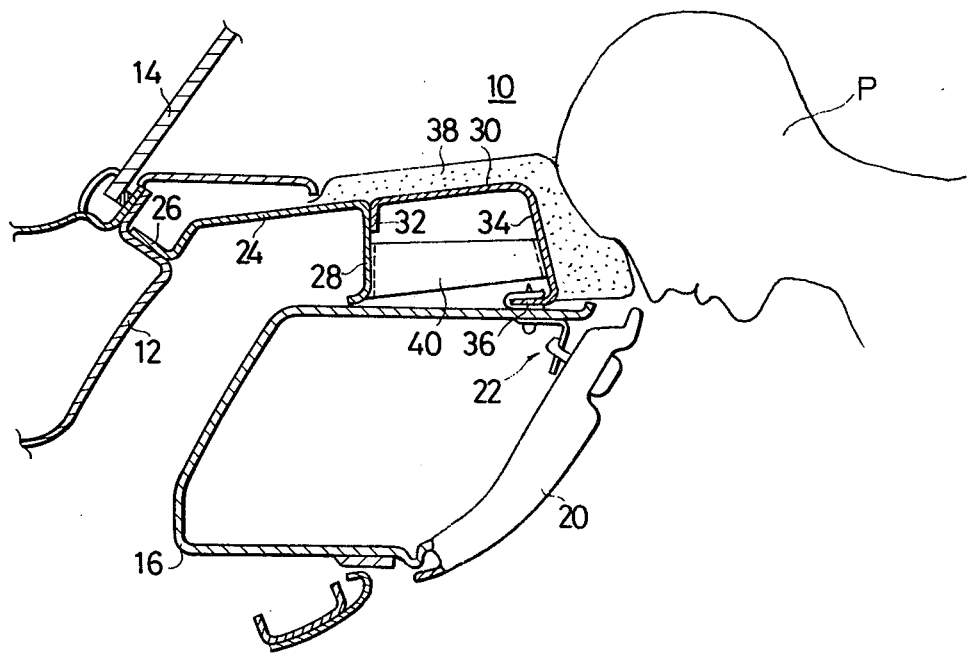
FIG. 2 is a sectional view of the conventional panelling arrangement, the view being taken along the line II—II of FIG. 1.
Figure 3:
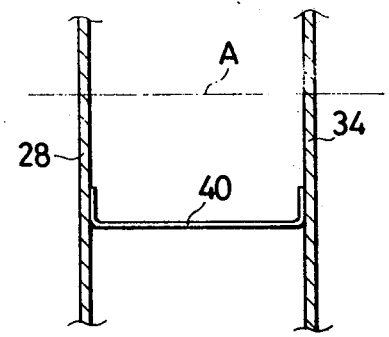
FIG. 3 illustrates the relationship between the axis of a support member employed in the conventional panelling arrangement and the longitudinal axis of the vehicle.

Referring to FIGS. 1 to 3, more particularly to FIG. 2, the conventional panelling arrangement generally designated by the reference numeral 10 is shown. The arrangement 10 is installed in a front portion of the vehicle passenger compartment. The front portion generally includes, as shown in these drawings, a fire wall 12 positioned under a windscreen 14, a glove box 16 protruding toward the central portion of the compartment and a gauge and meter panel 18 carrying thereon several kinds of gauges and meters. The glove box 16 is provided with a swingable lid 20. The numeral 22 designates locking means for the lid 20. Firmly fixed at its front edge portion 26 to an upper portion of the fire wall 12 is a first elongate sheet member 24 which has a rear edge portion 28 bent downwardly. Fixed at its front edge portion 32 to an upper portion of the rear edge portion 28 is second elongate sheet member 30 which has a rear edge portion 34 bent downwardly. The lower end of the rear edge portion 34 is connected to an upper portion of the glove box 16 via a conventional fastener 36, as shown. A padding member 38 made of foamed material, such as polyurethane foam, covers substantially the entire outer surface of the second elongate sheet member 30. Interposed between the rear edge portion 28 of the first elongate sheet member 24 and rear edge portion 34 of the second elongate sheet member 30 is a support member or plate 40.

However, in this conventional panelling arrangement 10, it has been observed that the support member 40 is arranged substantially parallel with the longitudinal axis "A" of the vehicle. More specifically, the longitudinal axis of the support member 40 is substantially parallel with that of the vehicle. This will be well understood from FIG. 3 showing thereon the longitudinal axis "A", the rear edge portion 28 of the first elongate sheet member 24, the rear edge portion 34 of the second elongate sheet member 30, and the support member 40.

With this known construction of the panelling arrangement, however, there will arise a risk to the passenger "p" in case of collision, especially in a head-on collision by the reason as follows: The support member 40 thus arranged will prevent the second elongate sheet member 30 from being sufficiently deformed when the head of the passenger P strikes the rear edge portion 34 through the padding member 30 in the collision.

Therefore, as mentioned before, the present invention proposes to eliminate such drawback encountered in the conventional panelling arrangement.

Figure 4:
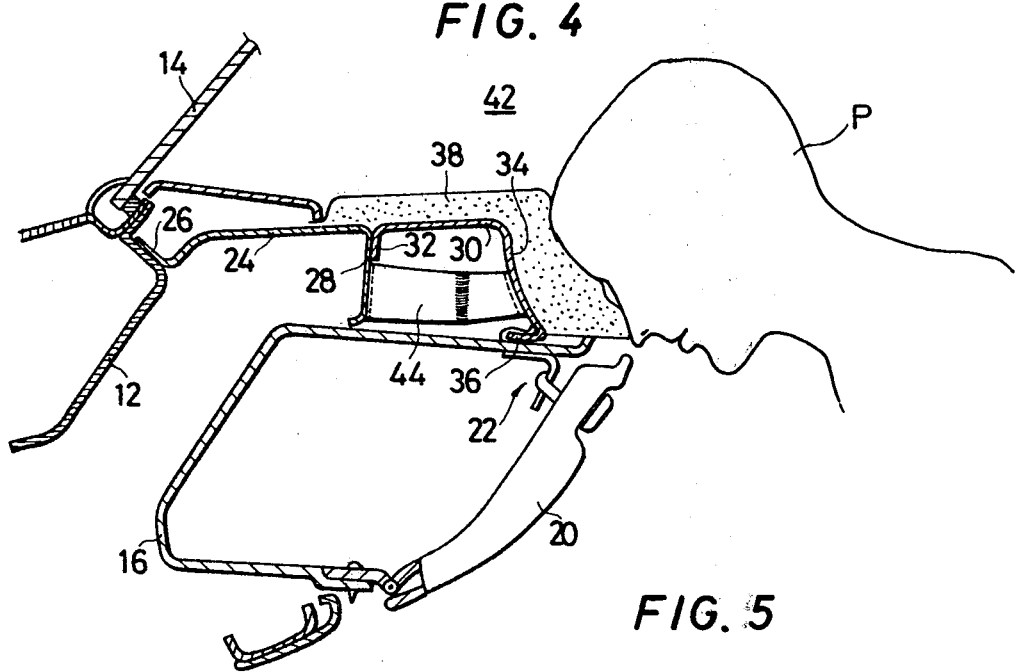
FIG. 4 is a sectional view of an improved safety panelling arrangement according to the present invention.

Referring to FIG. 4 of the drawings, there is shown an improved safety panelling arrangement 42 according to the present invention. As well seen in this drawing, the arrangement 42 is similar to the conventional arrangement illustrated in FIG. 2. Thus, in FIG. 4, the parts similar to those of the conventional arrangement 10 are designated by the same reference numerals as in the case of FIG. 2.

Figure 5:
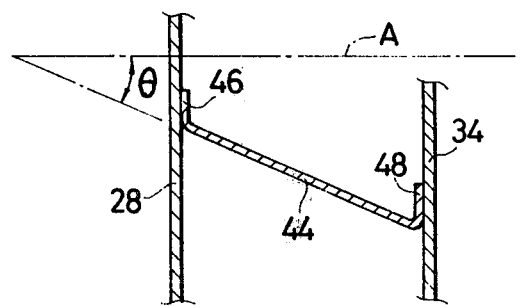
FIG. 5 illustrates the relationship between the axis of a support member employed in the improved safety panelling arrangement of FIG. 4 and the longitudianl axis of the vehicle.

However in the improved panelling arrangement of the present invention, the following considerations are essentially required, which are: (1) Both of the lateral axes of the rear edge portions 28 and 34 of the first and second elongate sheet members 24 and 30 are substantially perpendicular to the longitudinal axis "A" of the vehicle, (2) The longitudinal axis of the support member or plate 44 is inclined with respect to the longitudinal axis "A" of the vehicle. These will be well understood from FIG. 5 showing that the longitudinal axes of the support member 44 and the vehicle intersect each other at an angle θ. The angle θ is determined to range from about 5° to about 70° and preferably from about 5° to about 30°. The support member 44 is firmly fixed through its end flange portions 46 and 48 to the respective rear edge portions 28 and 34 by means of conventional fastening technic. Preferably, the support member 44 is fixed at an area of the panelling arrangement 42 most likely to be impacted by the head of the passenger "P" during a collision.

With this, the safety panelling arrangement 42 of the present invention will be sufficiently deformed, upon impact, to effectively absorb the impact force because of the inclined arrangement of the support member 44. This will be well understood from FIG. 6.

Figure 11:
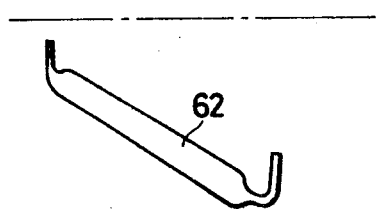

Several modifications of the support member 44 are shown in FIGS. 7 to 11 respectively. The support member or support plate portion 50 shown in FIG. 7 is formed by cutting or forming a slit defining the desired outline of same in the rear edge portion 28, and bending the portion with the slit to a predetermined angle with respect to the portion 28. The leading end of the support plate portion 50 is formed with a flange 52 which is fixed to the rear edge portion 34 by means of conventional fastening technic. On the contrary, the support portion 54 of FIG. 8 is formed by rear edge portion 34 in a generally same manner as in the case of FIG. 7. In these cases of FIGS. 7 and 8, the connecting operation between the members 28, 50 (54) and 34 is facilitated in comparison with the case of FIG. 5. FIG. 9 shows a support member or plate 56 which has a corrugated cross section to render it deformable. In FIG. 10, the support member or plate 58 has a longitudinally extending opening 60 therein to render it deformable also. FIG. 11 shows an example of using a rod member 62 as the support member. Now, it should be noted that these support members are made of materials such as steel, plastics and paper.

Figure 12:
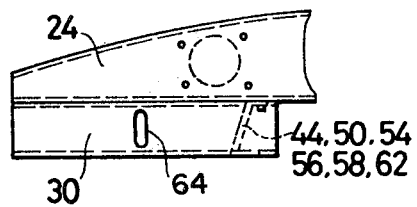
FIG. 12 shows an example in which an elongate opening is formed in one member constituting the safety panelling arrangement of the invention.

FIG. 12 shows an example in which an elongate opening 64 is formed in a horizontal portion of the second elongate sheet member 30. The provision of such opening and openings in the sheet member 30 is effective to render the subject panelling arrangement 42 more deformable. In this case, the support member may be a suitable one of the members 44, 50, 54, 56, 58 and 62.

Figure 13:
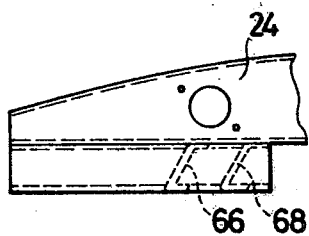
FIGS. 13 to 15 show examples in which two support members are employed in the safety panelling arrangement of the present invention.

FIG. 13 shows an example in which two support members 66 and 68 are set parallel with each other in the panelling arrangement 42. In this case, the support members 66 and 68 may be a combination of suitable two of the members 44, 50, 54, 56, 58 and 62.

Figure 14:
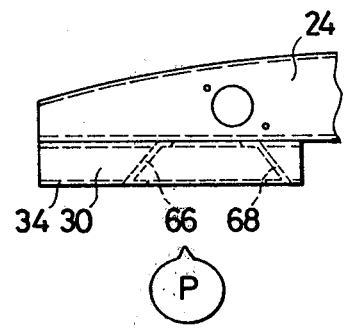
Figure 15:
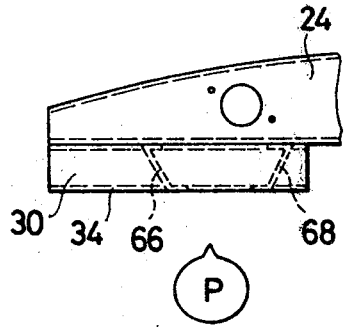

FIGS. 14 and 15 show respective examples in which the support members 66 and 68 are inclined to each other. In case of FIG. 14, the support members 66 and 68 are arranged in a manner that the distance therebetween increases as the members 66 and 68 extend toward the passenger "P". On the contrary, in case of FIG. 15, the distance decreases as they (66 and 68) extend toward the passenger "P".

It should be noted that the foregoing description shows only several exemplary embodiments. More various modifications are apparent to those skilled in the art without departing from the scope of the invention which is only limited by the appended claims.

What is claimed is:

1. A safety panelling arrangement for a motor vehicle having a floor and an elongate rigid member transversely disposed in said vehicle at a front portion of the passenger compartment under the windscreen, comprising:

a first elongate sheet member transversely disposed in said vehicle and having the front end thereof fixed to said elongate rigid member and the rear end portion thereof bent downwardly, the rear end portion of said first elongate sheet member forming a first supporting part the lateral axis of which is substantially perpendicular to the longitudinal axis of said vehicle;

a second sheet member transversely disposed in said vehicle and having the front end thereof fixed to the rear surface of said first elongate sheet member and the rear end portion thereof bent downwardly, the rear end portion of said second elongate sheet member forming a second supporting part the lateral axis of which is substantially parallel with that of said first supporting part; and a straightly extending member firmly spanned substantially horizontally between said first and second supporting parts, at a position below an area where said second elongate sheet member is fixed to said first elongate sheet member, in a manner that the longitudinal axis of said straightly extending member is inclined with respect to an imaginary plane which is perpendicular to said floor and includes therein said longitudinal axis of said vehicle, said area being an area most likely impacted by the head of a passenger in a passenger compartment in a vehicle collision.

2. A safety panelling arrangement as claimed in claim 1, further comprising padding means which covers substantially the entire outer surface of said second elongate sheet member.

3. A safety panelling arrangement as claimed in claim 1, in which said straightly extending member is an elongate plate having both longitudinal ends firmly connected to said first and second supporting parts, respectively.

4. A safety panelling arrangement as claimed in claim 1, in which said straightly extending member is formed by forming a slit defining the desired outline of same in said first supporting part of said first elongate sheet member and then bending the portion with the slit to a predetermined angle with respect to the base portion of said first supporting part, the leading end of said portion being firmly connected to said second supporting part of said second elongate sheet member.

5. A safety panelling arrangement as claimed in claim 1, in which said straightly extending member is formed by forming a slit defining the desired outline of same in said second supporting part of said second elongate sheet member and then bending the portion with the slit to a predetermined angle with respect to the base portion of said second supporting part, the leading end of said portion being firmly connected to said first supporting part of said first elongate sheet member.

6. A safety panelling arrangement as claimed in claim 3, in which said elongate plate has an opening therein to render it deformable.

7. A safety panelling arrangement as claimed in claim 1, in which said straightly extending member is a rod member.

8. A safety panelling arrangement as claimed in claim 1, in which the longitudinal axis of said straightly extending member crosses said imaginary plane of said motor vehicle at an angle ranging from 5° to 70°.

9. A safety panelling arrangement as claimed in claim 8, in which the longitudinal axis of said straight extending member crosses said imaginary plane of said motor vehicle at an angle ranging from 5° to 30°.

10. A safety panelling arrangement as claimed in claim 1, in which said second elongate sheet member has at its generally horizontal portion an opening to render it deformable.

11. A safety panelling arrangement as claimed in claim 1, further comprising another straightly extending member which is also spanned between said first and second supporting parts in a manner that the imaginary plane thereof is inclined with respect to said longitudinal axis of said motor vehicle.

12. A safety panelling arrangement as claimed in claim 11, in which said another straightly extending member is arranged parallel with previously mentioned supporting member.

13. A safety panelling arrangement as claimed in claim 11, in which said another straightly extending member is arranged inclined with respect to the previously mentioned supporting member.

* * * * *